United States Patent
Ohtsuka

(10) Patent No.: US 9,826,134 B2
(45) Date of Patent: Nov. 21, 2017

(54) IMAGING APPARATUS HAVING A MICROPHONE AND DIRECTIVITY CONTROL

(71) Applicant: Panasonic Intellectual Property Management Co., Ltd., Osaka (JP)

(72) Inventor: Yoshio Ohtsuka, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/062,733

(22) Filed: Mar. 7, 2016

(65) Prior Publication Data

US 2016/0286116 A1    Sep. 29, 2016

(30) Foreign Application Priority Data

Mar. 27, 2015 (JP) ................................. 2015-065872
Jan. 12, 2016 (JP) ................................. 2016-003144

(51) Int. Cl.
  *H04N 5/225* (2006.01)
  *H04N 5/232* (2006.01)
  *H04R 3/00* (2006.01)
  *H04R 1/32* (2006.01)

(52) U.S. Cl.
  CPC ....... *H04N 5/23203* (2013.01); *H04N 5/2251* (2013.01); *H04N 5/2252* (2013.01); *H04N 5/23245* (2013.01); *H04N 5/23293* (2013.01); *H04R 3/005* (2013.01); *H04R 1/326* (2013.01); *H04R 2499/11* (2013.01)

(58) Field of Classification Search
  CPC .............. H40N 5/2251; H04N 5/2252; H04N 5/23203; H04N 5/23245; H04N 5/23293; H04R 1/326
  See application file for complete search history.

(56) References Cited

U.S. PATENT DOCUMENTS

| | | | |
|---|---|---|---|
| 4,951,079 A | 8/1990 | Hoshino et al. | |
| 5,027,149 A | 6/1991 | Hoshino et al. | |
| 6,937,280 B2* | 8/2005 | Kawai ..................... | G06F 1/162 348/333.01 |
| 7,369,907 B2* | 5/2008 | Hibino .................... | G06F 1/162 348/333.01 |
| 7,394,480 B2* | 7/2008 | Song ..................... | H04M 1/656 348/14.02 |
| 7,953,460 B2* | 5/2011 | You ..................... | H04M 1/0208 381/111 |
| 8,189,818 B2* | 5/2012 | Takahashi .............. | H04R 1/406 345/156 |

(Continued)

FOREIGN PATENT DOCUMENTS

JP          01-191839          8/1989

*Primary Examiner* — Amy Hsu
(74) *Attorney, Agent, or Firm* — Wenderoth, Lind & Ponack, L.L.P.

(57) ABSTRACT

A digital camera includes a body that contains a CCD image sensor for capturing an object image, a monitor that is pivotably mounted relative to the body and displays an image signal relating to the object image captured by the CCD image sensor, a microphone, and a controller for changing sound pickup directivity of the microphone according to an orientation of the monitor relative to the body. This increases sound pickup sensitivity for voice-enabled shutter operation.

5 Claims, 9 Drawing Sheets

(56) References Cited

U.S. PATENT DOCUMENTS

| | | | |
|---|---|---|---|
| 8,401,178 B2* | 3/2013 | Chen | G10L 21/0208 379/406.02 |
| 2001/0011993 A1* | 8/2001 | Saarinen | G06F 1/1605 345/156 |
| 2002/0181722 A1* | 12/2002 | Hibino | G01H 3/00 381/92 |
| 2003/0048481 A1* | 3/2003 | Kobayashi | H04N 5/2251 358/302 |
| 2005/0069149 A1* | 3/2005 | Takahashi | H04R 1/406 381/91 |
| 2005/0140810 A1* | 6/2005 | Ozawa | H04N 5/23293 348/333.02 |
| 2006/0002686 A1* | 1/2006 | Arima | H04L 47/10 386/240 |
| 2006/0159445 A1* | 7/2006 | Ono | G03B 17/00 396/312 |
| 2006/0199734 A1* | 9/2006 | Yamashita | H04N 1/00204 503/227 |
| 2009/0122157 A1* | 5/2009 | Kuboyama | G10L 25/78 348/231.4 |
| 2011/0102659 A1* | 5/2011 | Maekawa | H04N 5/2251 348/333.06 |
| 2012/0176535 A1* | 7/2012 | Takeda | H04N 13/0239 348/375 |
| 2012/0218377 A1* | 8/2012 | Oku | H04N 5/23238 348/36 |
| 2013/0176403 A1* | 7/2013 | Varga | H04N 13/0242 348/48 |
| 2013/0297319 A1* | 11/2013 | Kim | G10L 15/22 704/275 |
| 2013/0321568 A1* | 12/2013 | Suzuki | H04N 5/23238 348/36 |
| 2014/0063303 A1* | 3/2014 | Masuda | H01L 27/14625 348/294 |
| 2015/0070559 A1* | 3/2015 | Faehrmann | H04N 5/2252 348/333.01 |
| 2015/0125022 A1* | 5/2015 | Jacobs | H04R 3/005 381/355 |

* cited by examiner

IMAGING APPARATUS HAVING A MICROPHONE AND DIRECTIVITY CONTROL

BACKGROUND

1. Technical Field

The present disclosure relates to a voice-activated imaging apparatus.

2. Description of Related Art

Recently, voice-activated electronic devices that are equipped with a microphone and can be operated by voice have been in widespread use. Unexamined Japanese Patent Publication No. H01-191839 discloses a speech recognition camera that can be operated by speech recognition.

SUMMARY

A voice-activated camera is desired to pick up operator's voice with higher sensitivity.

A technique according to the present disclosure provides an imaging apparatus capable of picking up operator's voice with higher sensitivity.

An imaging apparatus of the present disclosure includes a body that contains an imaging unit for capturing an object image, a monitor that is pivotably mounted relative to the body and displays an image signal relating to the object image captured by the imaging unit, a microphone, and a control unit for changing sound pickup directivity of the microphone according to an orientation of the monitor relative to the body.

The imaging apparatus of the present disclosure, which can pick up a voice of a camera operator with higher sensitivity, facilitates a voice-enabled shutter operation.

DETAILED DESCRIPTION

Exemplary embodiments will now be described in detail with reference to the drawings. Unnecessary details, however, may be omitted. For example, detailed description of well-known matters and repeated description of substantially the same structure may be omitted. This is to avoid unnecessary redundancy in the following description and to facilitate understanding by those skilled in the art.

The accompanying drawings and the following description are provided to enable those skilled in the art to have a thorough understanding of the present disclosure, and these are not intended to limit the subject matter defined by the claims.

First Exemplary Embodiment

A digital camera, which is an example of an imaging apparatus with a microphone, is described in the present exemplary embodiment. In the following description, a direction toward an object will be referred to as "forward", a direction away from the object as "rearward", a vertically upward direction as "upward", a vertically downward direction as "downward", and right and left directions from the digital camera facing the object as "rightward" and "leftward", respectively, with respect to the normal orientation (hereinafter also referred to as landscape orientation) of the digital camera.

[1. Structure]

[1-1. Structure of Digital Camera]

A structure of digital camera 100 is described below with reference to FIGS. 1 to 5.

Figure 1:
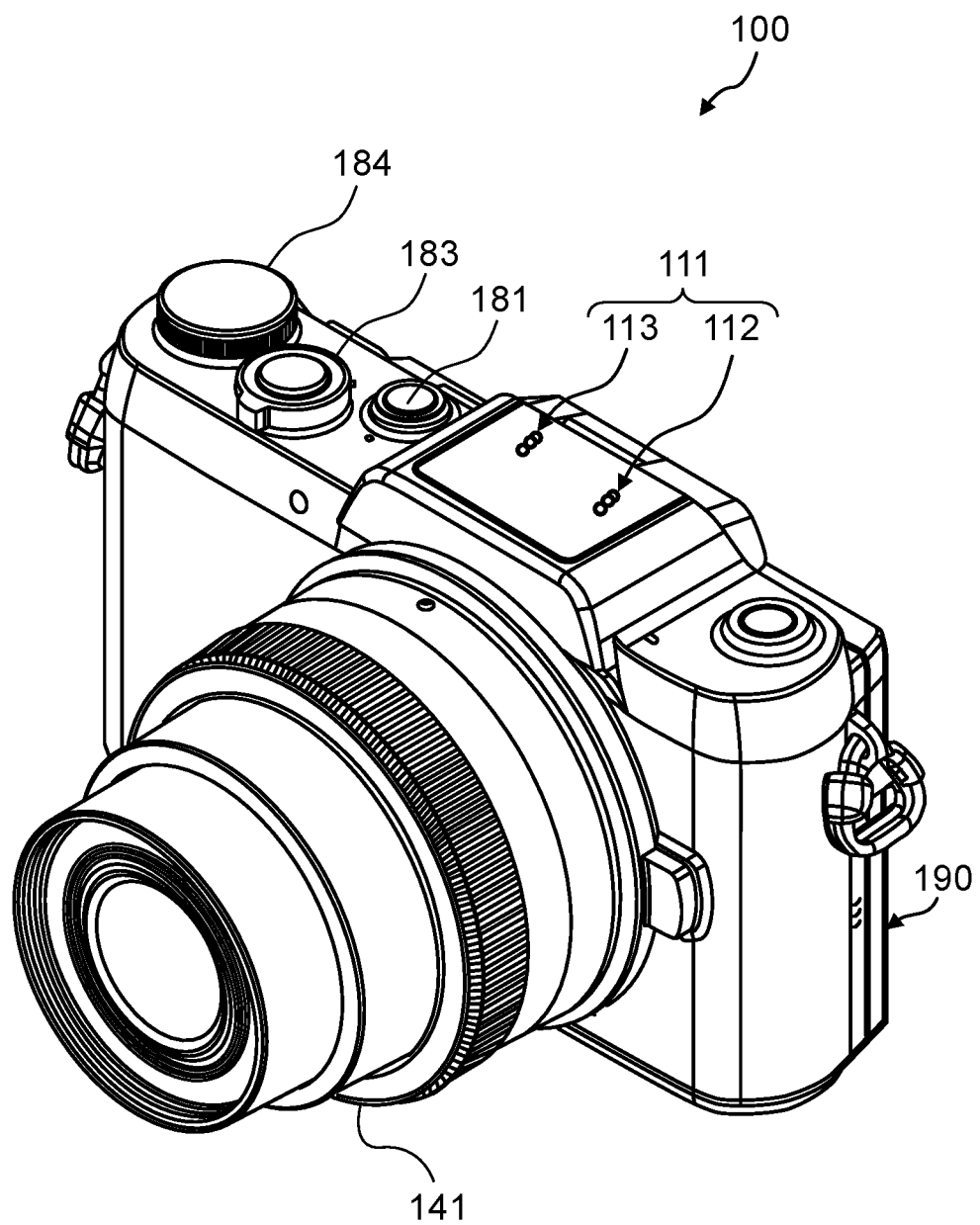
FIG. 1 is a front perspective view showing an appearance of a digital camera with a monitor closed according to a first exemplary embodiment.
Figure 2:
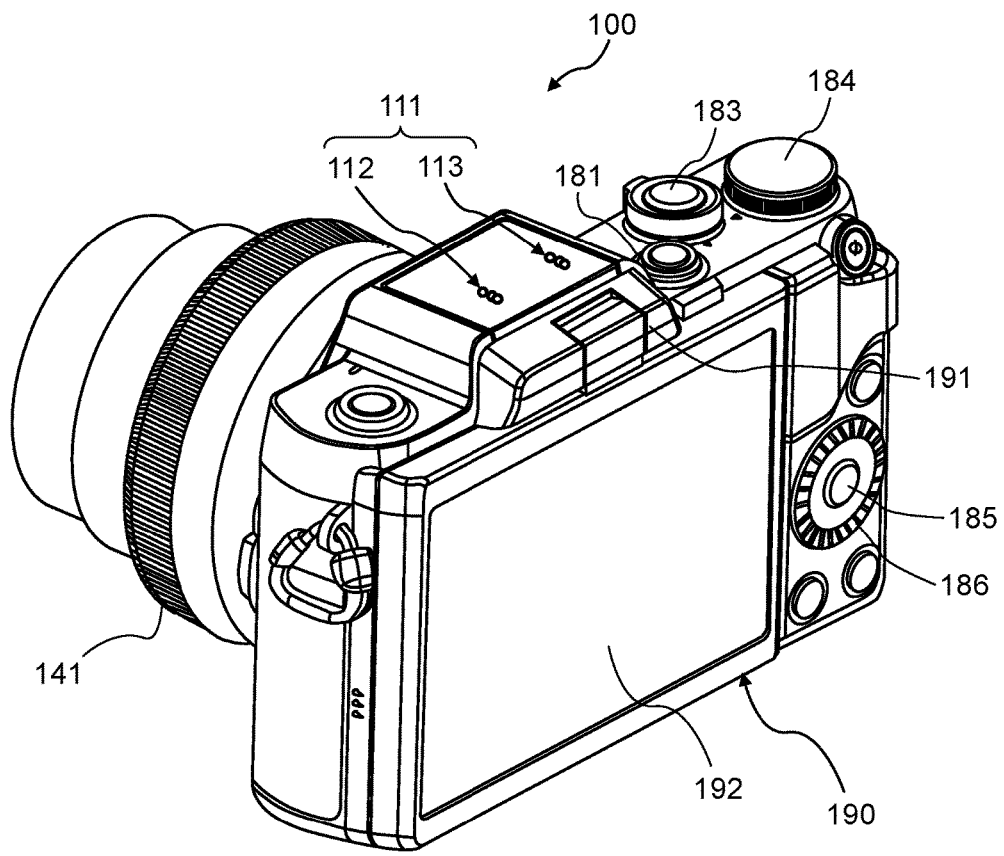
FIG. 2 is a rear perspective view showing an appearance of the digital camera with the monitor closed according to the first exemplary embodiment.

FIG. 1 is a front perspective view showing an appearance of digital camera 100 with monitor 190 closed (i.e., with monitor 190 facing rearward). FIG. 2 is a rear perspective view showing an appearance of digital camera 100 with monitor 190 closed. Digital camera 100 includes lens barrel 141 on the front thereof. Digital camera 100 includes monitor 190 on the rear thereof. Digital camera 100 includes release button 181, power switch 183, and mode dial 184 on a top thereof.

Monitor 190 is a liquid crystal display. Lens barrel 141 is provided with a plurality of lenses. Release button 181 is a push button, which is pressed in two stages, i.e., halfway and all the way. When release button 181 is pressed halfway by a user, AF (Auto-Focus) control, AE (Auto Exposure) control, or the like is performed and shooting conditions are fixed. Power switch 183 is a switch for turning on and off power supplied to various parts of digital camera 100. Mode dial 184 is a rotary dial. The user changes an operation mode by rotating mode dial 184. The operation mode includes, for example, an auto shooting mode, manual shooting mode, scene selection mode, etc., where the auto shooting mode, the manual shooting mode, and the scene selection mode are collectively denoted as a shooting mode.

Digital camera 100 includes microphone 111 on a top thereof. Microphone 111 includes microphone L 112 and microphone R 113. Microphone L 112 and microphone R 113 are arranged in the left and right direction, spaced apart with each other, on the top of a body of digital camera 100.

Digital camera 100 includes center button 185 and directional button 186 on a rear side thereof. Center button 185 is a push button. When the user presses center button 185 in a shooting mode or a playback mode of digital camera 100, monitor 190 displays a menu screen. The menu screen is to allow the user to set various shooting conditions and playback conditions. When center button 185 is pressed with values of setting items for various conditions selected on the menu screen by the user, the selected values are fixed for the setting items.

Directional button 186 is an annular push button, and center button 185 is located in the annulus of directional button 186. The user can select the values of the setting items for various conditions displayed on the menu screen by pressing one of an upper portion, a lower portion, a left portion, and a right portion of directional button 186.

Figure 3:
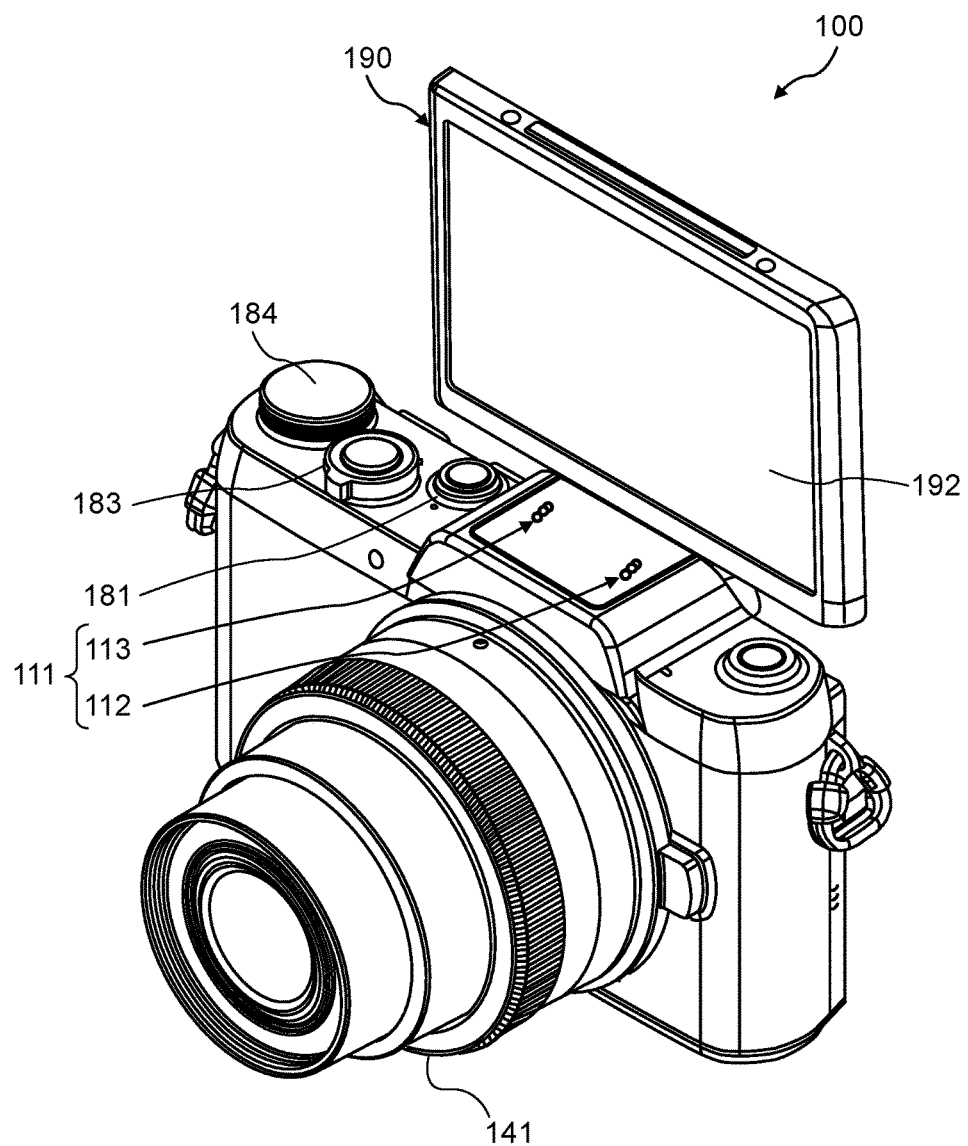
FIG. 3 is a front perspective view showing an appearance of the digital camera with the monitor open according to the first exemplary embodiment.
Figure 4:
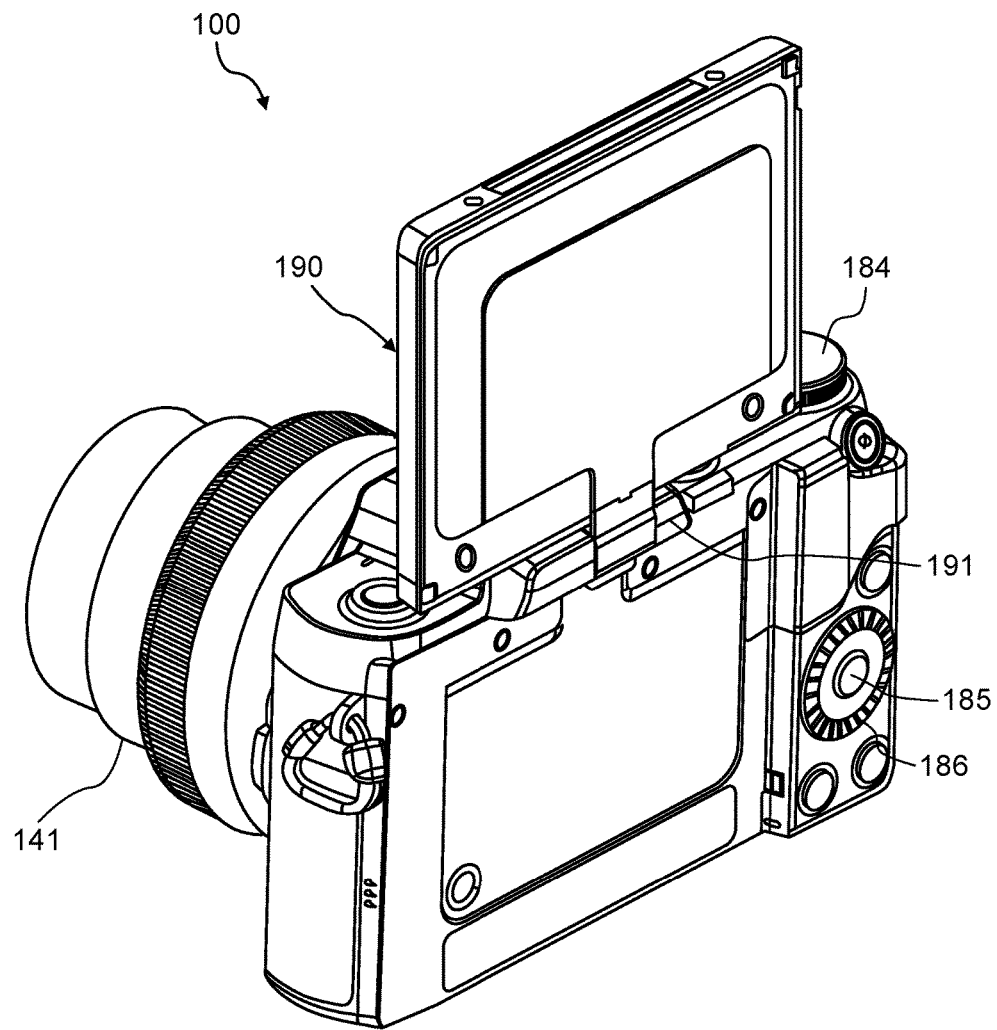
FIG. 4 is a rear perspective view showing an appearance of the digital camera with the monitor open according to the first exemplary embodiment.

FIG. 3 is a front perspective view showing an appearance of digital camera 100 with monitor 190 open (i.e., with monitor 190 protruding upward from the body). FIG. 4 is a rear perspective view showing an appearance of digital camera 100 with monitor 190 open. The top of the body of digital camera 100 is provided with hinge shaft 191 for pivoting movement of monitor 190. Hinge shaft 191 is an example of a pivot shaft according to the present disclosure. Hinge shaft 191 extends in the left and right directions at the upper portion of monitor 190. Monitor 190 can be turned into a state in which monitor 190 faces forward, namely, is open by virtue of a hinge structure that provides for pivoting movement about hinge shaft 191 within a predetermined range. The state in which monitor 190 faces forward means in particular a state in which display screen 192 of monitor 190 faces forward. In the state in which monitor 190 is open and faces forward, the direction to which monitor 190 is directed is substantially the same as a direction to which an optical axis of lens barrel 141 is directed (i.e., a forward direction). Monitor 190, which is open and faces forward, is convenient for a user when both an object and the user are in front of digital camera 100, i.e., in the case of taking a self-portrait. When taking a self-portrait, the user uses digital camera 100 with monitor 190 open and facing forward. It is desirable for forward-facing monitor 190 to display an image that is obtained by rotating an image displayed on rearward-facing monitor 190 by 180 degrees in order to facilitate viewing of the image displayed on monitor 190 by the user.

Figure 5:
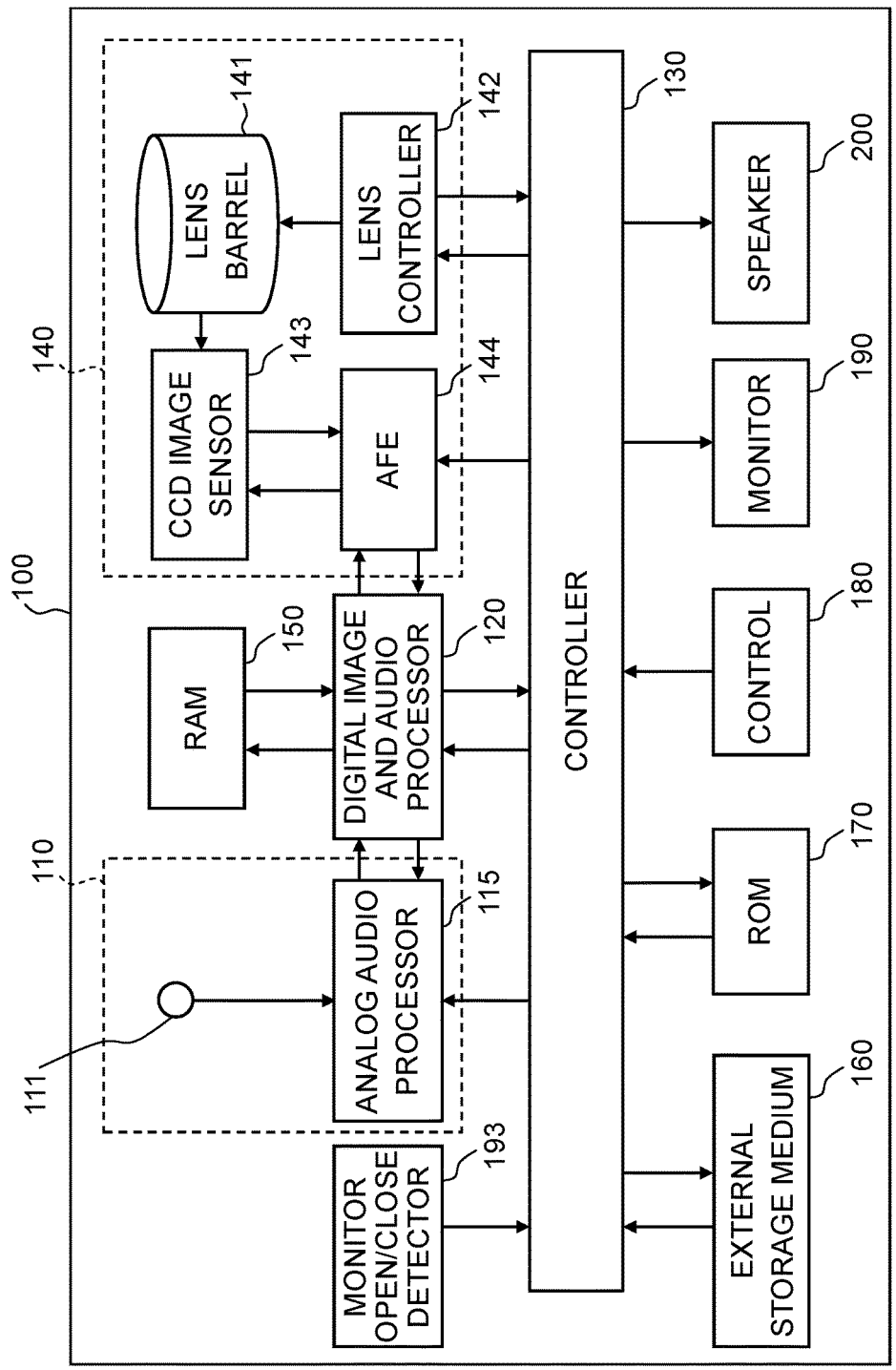
FIG. 5 is a block diagram showing a structure of the digital camera according to the first exemplary embodiment.

FIG. 5 is a block diagram showing a structure of digital camera 100. Digital camera 100 includes image input system 140, voice input system 110, digital image and audio processor 120, controller 130, RAM 150, monitor open/close detector 193, external storage medium 160, ROM 170, control 180, monitor 190, and speaker 200. Controller 130 is an example of a control unit according to the present disclosure, and external storage medium 160 is an example of a memory according to the present disclosure.

Image input system 140 includes lens barrel 141, lens control unit 142, CCD (Charge Coupled Device) image sensor 143, and AFE (Analog Front End) 144. CCD image sensor 143 is an example of an imaging unit according to the present disclosure.

Lens barrel 141 performs focus adjustment and view angle adjustment for an object, adjustment of the amount of incident light, and image stabilization using a motor driven in response to a control signal transmitted from lens control unit 142, thus forming an object image.

Lens control unit 142 generates the control signal based on a signal from controller 130 and drives lens barrel 141 using the motor driven in response to the control signal.

CCD image sensor 143 captures the object image formed through lens barrel 141 to generate an image signal. CCD image sensor 143 generates an image signal of a new frame at a predetermined time interval in the shooting mode of digital camera 100. CCD image sensor 143 may be constituted by a CMOS (Complementary Metal Oxide Semiconductor) image sensor.

AFE 144 performs noise reduction using correlated double sampling, amplification to an input range width of an A/D converter using an analog gain controller, and A/D conversion using the A/D converter on the image signal from CCD image sensor 143. AFE 144 then outputs the image signal to digital image and audio processor 120.

Voice input system 110 includes microphone 111 and analog audio processor 115. Microphone 111 converts an acoustic signal into an electrical signal to output the electrical signal to analog audio processor 115. Analog audio processor 115 processes the electrical signal from microphone 111 to generate an audio signal, A/D converts the audio signal using the A/D converter, and outputs the converted audio signal to digital image and audio processor 120.

Digital image and audio processor 120 performs various processing operations on the image signal from AFE 144 and the audio signal from analog audio processor 115. For example, digital image and audio processor 120 performs gamma correction, white balance correction, defect correction, coding processing, etc. on the image signal in accordance with an indication from controller 130. Digital image and audio processor 120 also performs various processing operations on the audio signal in accordance with an indication from controller 130. For example, digital image and audio processor 120 performs an arithmetic operation on an output of microphone 111 and performs directivity synthesis. The details of the directivity synthesis are described below. Digital image and audio processor 120 may be implemented in a hard-wired electronic circuit, a microcomputer running a program, or the like. Digital image and audio processor 120 may be implemented in a single semiconductor chip into which digital image and audio processor 120, controller 130, etc. are integrated.

Controller 130 controls overall operation of digital camera 100. Controller 130 may be implemented in a hard-wired electronic circuit, a microcomputer running a program, or the like. Controller 130 may also be implemented in a single semiconductor chip into which controller 130, digital image and audio processor 120, etc. are integrated.

RAM 150 functions as a working memory of digital image and audio processor 120 and controller 130. RAM 150 can be implemented in SDRAM (Synchronous Dynamic RAM), flash memory, or the like. RAM 150 also functions as an internal memory for storing an image signal, an audio signal, etc. That is, RAM 150 also functions as an example of the memory according to the present disclosure. Detection results from monitor open/close detector 193 may be stored in RAM 150.

Monitor open/close detector 193 detects an open or closed state, that is, whether monitor 190 is open and faces forward, and a result of the detection is input to controller 130. For example, digital camera 100 is provided with a switch that is pressed by monitor 190 and is turned on when monitor 190 opens and faces forward and that is not pressed by monitor 190 and remains off when monitor 190 is closed and does not face forward. An on/off state of this switch may be input to controller 130 to enable detection of the open or closed state.

External storage medium 160 is an external memory having therein a nonvolatile storage device, such as a flash memory. External storage medium 160 can store data such as, for example, an image signal and an audio signal processed by digital image and audio processor 120.

ROM 170 stores programs executed by controller 130 such as, for example, programs on autofocus control (AF control), automatic exposure control (AE control), etc. and a program for controlling overall operation of digital camera 100. ROM 170 also stores various conditions and settings on digital camera 100 including a result of detection from monitor open/close detector 193 (i.e., a detection of whether monitor 190 is open and faces forward). ROM 170 is a flash ROM in the present exemplary embodiment. ROM 170 need not be provided outside controller 130 (i.e., separately from controller 130), and ROM 170 may be incorporated in controller 130.

Control 180 is a collective term for operation interfaces such as operation buttons and operation dials located on the exterior of digital camera 100. Control 180 is operated by a user. Control 180 includes release button 181, power switch 183, mode dial 184, center button 185, and directional button 186. When operated by the user, control 180 transmits signals to instruct various operations to controller 130.

Monitor 190 displays a through-the-lens image generated by image input system 140 and a playback image stored in external storage medium 160, etc. The through-the-lens image is an image of new frames that are periodically and continuously generated by CCD image sensor 143. When digital camera 100 is in a standby state in which still image is not captured or in a video capture state while digital camera 100 is set in the shooting mode, digital image and audio processor 120 normally generates a through-the-lens image from the image signal generated by CCD image sensor 143. The user can take a picture of an object while checking the composition of the object by viewing the through-the-lens image displayed on monitor 190. Monitor 190 also displays a menu screen for allowing the user to set various shooting conditions and playback conditions.

Speaker 200 produces the stored voice in conjunction with a playback image when the playback image is displayed.

[2. Operation]

[2-1. Operation of Processing Audio Directivity]

Positioning of microphone 111 and directivity synthesis using digital image and audio processor 120 are described in detail with reference to FIGS. 6A to 6F and FIG. 7.

Figure 6C:
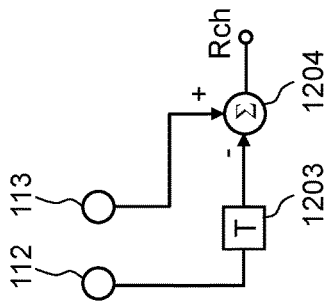
FIG. 6C is a diagram showing an example of directivity synthesis of the digital camera according to the first exemplary embodiment.
Figure 6B:
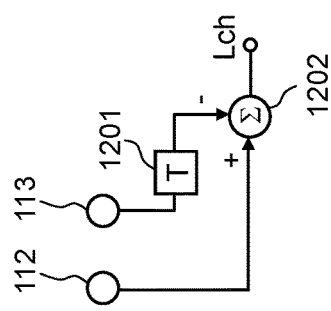
FIG. 6B is a diagram showing an example of directivity synthesis of the digital camera according to the first exemplary embodiment.
Figure 6A:
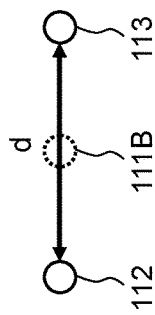
FIG. 6A is a diagram showing an example of directivity synthesis of the digital camera according to the first exemplary embodiment.

FIG. 6A illustrates positions of microphone L 112 and microphone R 113. Digital image and audio processor 120 generates output Lch, output Rch, and output Cch, described below, based on the outputs of microphone L 112 and microphone R 113. Output Lch, output Rch, and output Cch are outputs processed by directivity synthesis using the outputs of microphone L 112 and microphone R 113 so that output Lch, output Rch, and output Cch have directivity in the leftward direction, the rightward direction, and the axial direction (i.e., the forward direction and the rearward direction) of the lens barrel, respectively. A distance between microphone L 112 and microphone R 113 is represented by reference symbol d. In the present exemplary embodiment, microphone L 112 and microphone R 113 are omni-directional and have equal acoustic sensitivities.

FIG. 6B is a diagram showing directivity synthesis to obtain output Lch. A sound wave coming from the right of digital camera 100 reaches right microphone R 113 earlier and then reaches left microphone L 112 at a distance d away from microphone R 113 after an elapse of time τ1. A relationship among time τ1, distance d, and sound speed c is represented by the following equation:

$$\tau1 = d/c \qquad \text{Eq. (1)}$$

Time it can be calculated from distance d and sound speed c using Eq. (1). The output of right microphone R 113 is delayed by time it and the delayed output is subtracted from the output of left microphone L 112, whereby an output caused by the sound wave coming from the right is cancelled. Delay device 1201 provides a delay of time τ1 to the output of microphone R 113. Subtractor 1202 subtracts the output of delay device 1201 from the output of microphone L 112 to provide output Lch. The above process provides output Lch that is less sensitive to the sound wave coming from the right.

FIG. 6C is a diagram showing directivity synthesis to obtain output Rch. The process of FIG. 6C is similar to that of FIG. 6B except that right and left are reversed in FIG. 6C. That is, delay device 1203 provides a delay of time τ1 to the output of microphone L 112. Subtractor 1204 subtracts the output of delay device 1203 from the output of microphone R 113 to provide output Rch. The above process provides output Rch that is less sensitive to the sound wave coming from the left.

Figure 6F:
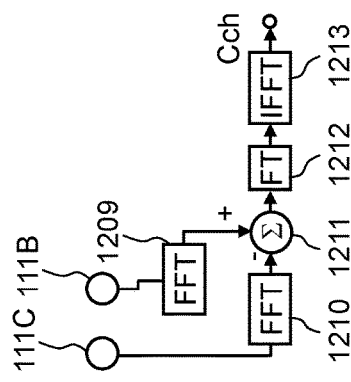
FIG. 6F is a diagram showing an example of directivity synthesis of the digital camera according to the first exemplary embodiment.
Figure 6E:
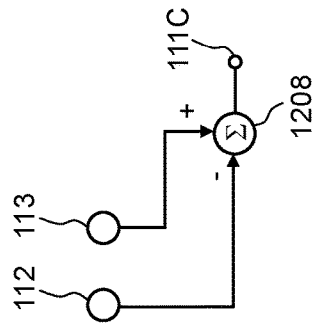
FIG. 6E is a diagram showing an example of directivity synthesis of the digital camera according to the first exemplary embodiment.
Figure 6D:
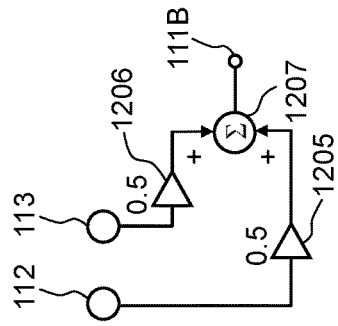
FIG. 6D is a diagram showing an example of directivity synthesis of the digital camera according to the first exemplary embodiment.

FIG. 6D illustrates a process to obtain an output of virtual microphone 111B. The output of virtual microphone 111B (see FIG. 6A), which is located geometrically in a center of left and right microphones L 112, R 113, is obtained by taking an average of the output of left microphone L 112 and the output of right microphone R 113. Amplifier 1205 halves the output of microphone L 112. Amplifier 1206 halves the output of microphone R 113. Adder 1207 adds an output of amplifier 1205 and an output of amplifier 1206. Thus, the output of virtual microphone 111B is obtained.

FIG. 6E illustrates a process to obtain an output of virtual microphone 111C. The output of virtual microphone 111C insensitive to the geometric center of left and right microphones L 112, R 113 is obtained by taking a difference between the output of left microphone L 112 and the output of right microphone R 113. Adder 1208 subtracts the output of microphone L 112 from the output of microphone R 113. Thus, the output of virtual microphone 111C is obtained.

FIG. 6F is a diagram showing directivity synthesis to obtain output Cch. Output Cch that is directed along the optical axis is obtained by subtracting the output of virtual microphone 111C from the output of virtual microphone 111B in a frequency domain. FFT 1209 converts the output of virtual microphone 111B from a time domain to a frequency domain. FFT 1210 converts the output of virtual microphone 111C from a waveform in the time domain to a waveform in the frequency domain. Adder 1211 subtracts the output of FFT 1210 from the output of FFT 1209. Filter 1212 sets a result of the subtraction to zero if the output of adder 1211 is negative. Thus, an operational malfunction due to over-subtraction is eliminated. IFFT 1213 converts the output of filter 1212 from a frequency domain to a time domain and obtains output Cch. The above process provides output Cch that is less sensitive to the sound wave coming from the lateral and is highly sensitive to the direction in the optical axis. FIG. 6F is an example showing directivity synthesis to obtain output Cch and is not intended to be limiting.

Output Lch and output Rch, which are generated by the above-described directivity synthesis, are represented as follows:

Output Lch: $Lch(\tau)=Lcho(\tau)-Rcho(\tau-\tau 1)$

Output Rch: $Rch(\tau)=Rcho(\tau)-Lcho(\tau-\tau 1)$

Here, actual outputs of microphone L 112 and microphone R 113 are denoted as Lcho ($\tau$) and Rcho ($\tau$) and the outputs generated by the directivity synthesis are denoted as Lch ($\tau$) and Rch ($\tau$), respectively. Lch ($\tau$) and Rch ($\tau$) correspond to the above-described outputs Lch and Rch, respectively.

Figure 7:
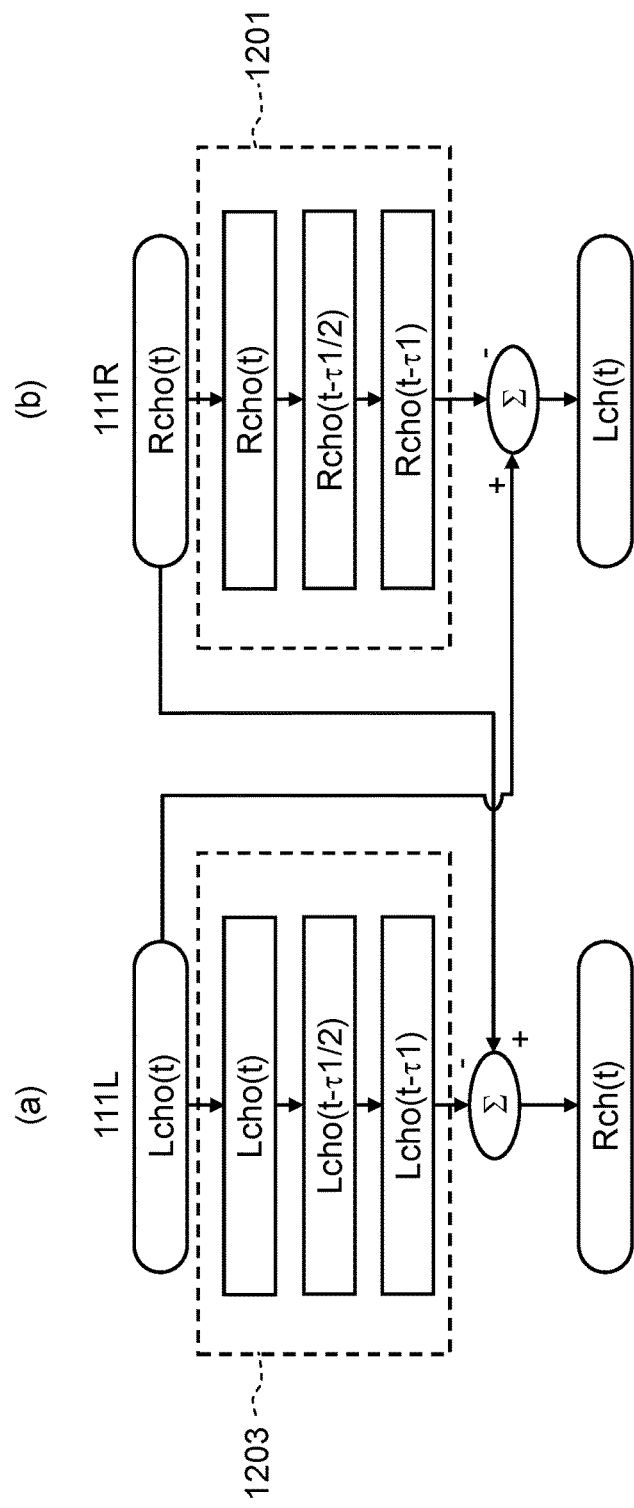
FIG. 7 is a diagram showing details of the directivity synthesis of the digital camera according to the first exemplary embodiment.

FIG. 7 is a diagram showing details of the directivity synthesis. As shown in FIG. 7, outputs Lch ($\tau$), Rch ($\tau$) after the directivity synthesis are obtained by delaying actual outputs Lcho ($\tau$), Rcho ($\tau$) using delay devices 1203, 1201.

For example, in delay devices 1203, 1201, when new data Lcho ($\tau$), Rcho ($\tau$) are input, old data Lcho ($\tau-\tau 1$), Rcho ($\tau-\tau 1$) are output, respectively. More specifically, in FIG. 7, actual outputs Lcho ($\tau$), Rcho ($\tau$) are input to delay devices 1203, 1201, respectively, at intervals of half the time ($\tau \frac{1}{2}$) of delay time $\tau 1$. When delay time $\tau 1$ has elapsed, past actual outputs Lcho ($\tau-\tau 1$), Rcho ($\tau-\tau 1$) are output.

In the present exemplary embodiment, delay devices 1201, 1203 are included in digital image and audio processor 120. For example, if digital image and audio processor 120 has a DSP (Digital Signal Processor), the delay process described above is performed in a delay memory, such as a register, of the DSP. This improves access speed to the data compared to storing actual outputs Lcho ($\tau$), Rcho ($\tau$) in RAM 150, so that the directivity synthesis can be accelerated.

Output Lch, output Rch, and output Cch are obtained by performing the directivity synthesis such as described above in digital image and audio processor 120.

Note that while an example in which actual outputs Lcho ($\tau$), Rcho ($\tau$) are input to delay devices 1203, 1201, respectively, at intervals of half the time of delay time $\tau 1$ is shown in FIG. 7 for ease of description, the time interval in which actual outputs Lcho ($\tau$), Rcho ($\tau$) are input to delay devices 1203, 1201 is not limited to that of the present exemplary embodiment, and any time interval may be used.

[2-2. Operation of Digital Camera]

An operation of digital camera 100 will now be described with reference to FIGS. 8A, 8B and FIG. 9.

Figure 8A:
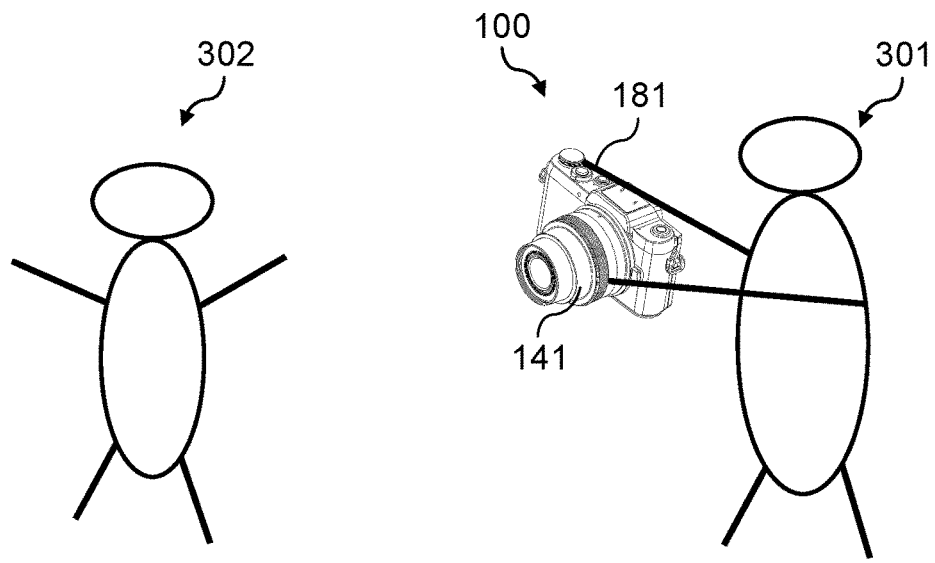
FIG. 8A illustrates a positional relationship between a digital camera, a monitor, a user, and an object according to the first exemplary embodiment.
Figure 8B:
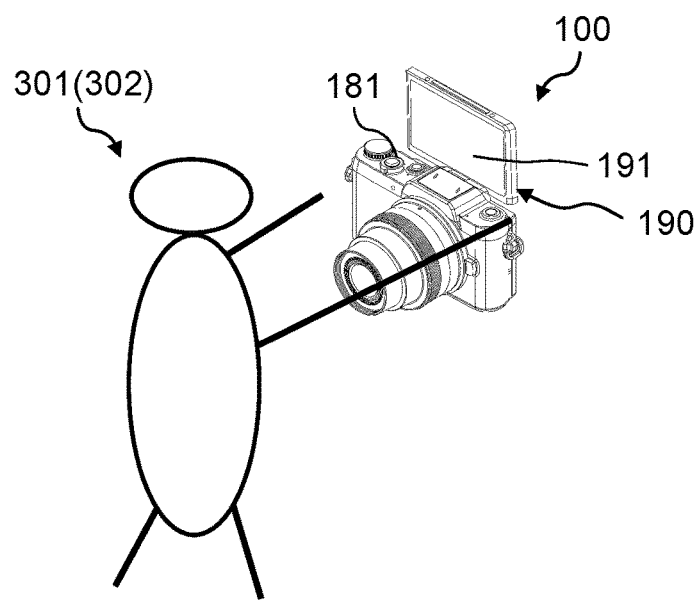
FIG. 8B illustrates a positional relationship between a digital camera, a monitor, a user, and an object according to the first exemplary embodiment.

FIGS. 8A and 8B illustrate a positional relationship among digital camera 100, monitor 190, user 301, and object 302. FIG. 8A illustrates that object 302 is in front of digital camera 100, user 301 is behind digital camera 100, and monitor 190 is closed and faces rearward. In such a case, it is easy for user 301 to hold digital camera 100 with both hands while keeping a certain distance between object 302 and digital camera 100 and viewing monitor 190. User 301 operates release button 181 with his/her right hand while holding lens barrel 141 with his/her left hand.

FIG. 8B illustrates a self-portrait mode in which object 302 is user 301, where user 301 also being object 302 is in front of digital camera 100 and monitor 190 is open and faces forward (i.e., display screen 192 of monitor 190 faces forward). In such a case, it is not easy for user 301 to hold digital camera 100 with both hands while keeping a certain distance between user 301 also being object 302 and digital camera 100 and viewing monitor 190. As such, if user 301 seeks to increase a distance between user 301 also being object 302 and digital camera 100 as much as possible under such conditions, user 301 would hold digital camera 100 with one hand. However, it is difficult to operate release button 181 with the one hand. The present exemplary embodiment, in which user 301 activates a shutter by his/her voice, facilitates the operation of taking a self-portrait.

Figure 9:
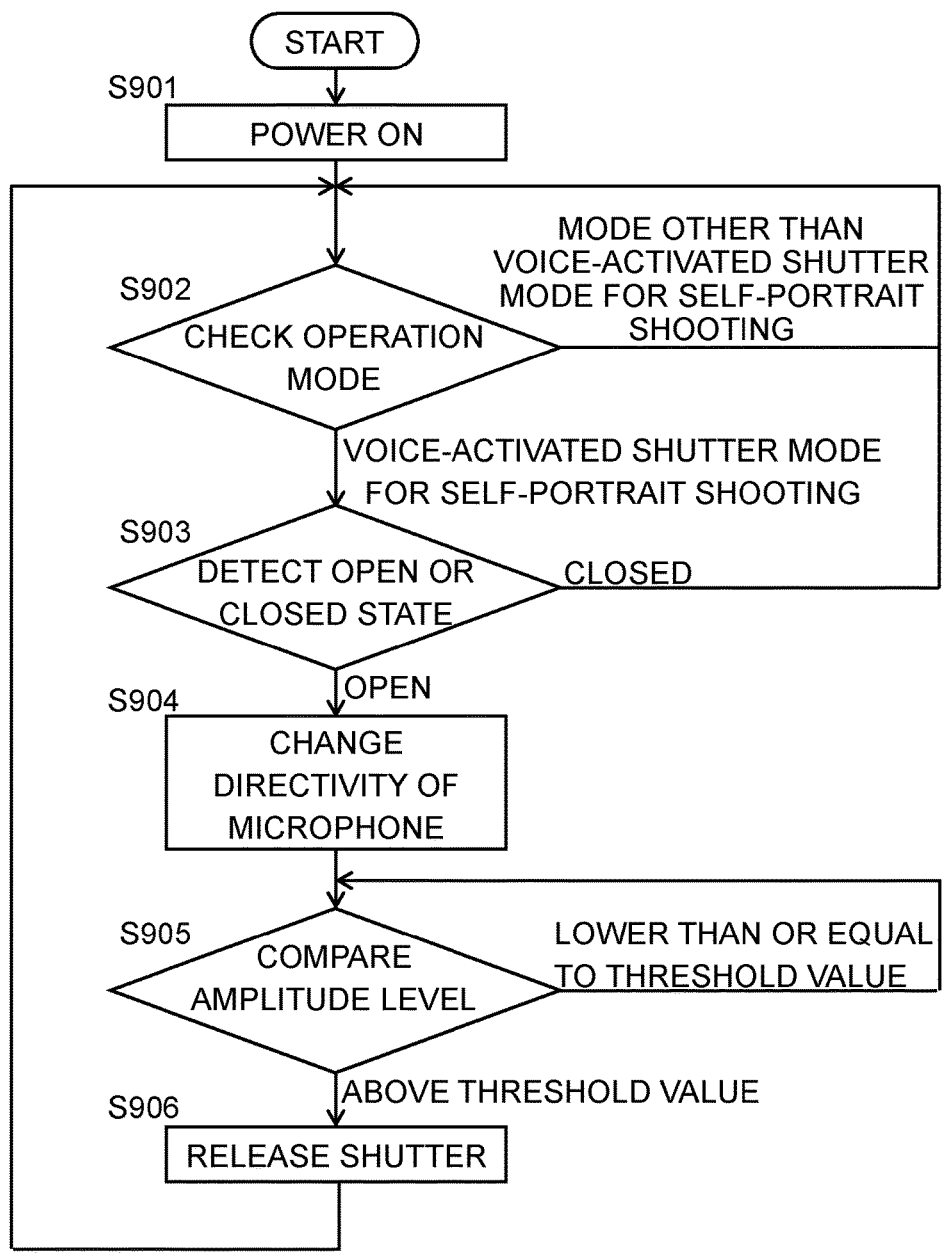
FIG. 9 is a flow chart illustrating a process of taking a self-portrait according to the first exemplary embodiment.

FIG. 9 is a flow chart illustrating an overall process of taking a self-portrait using digital camera 100.

When power switch 183 is operated by a user, digital camera 100 is powered on and turned into a powered-on state (S901).

Controller 130 is powered on (S901) and then a set operation mode is checked (S902). An operation mode is set by operating a menu screen on monitor 190 using center button 185 and directional button 186.

If the operation mode is found to be a voice-activated shutter mode for self-portrait shooting after the operation mode is checked (S902), controller 130 detects an open or closed state of monitor 190 (S903).

If the operation mode is found to be a mode other than the voice-activated shutter mode for self-portrait shooting after the operation mode is checked (S902), controller 130 does not detect the open or closed state of monitor 190.

If monitor 190 is found to be open after the open or closed state of monitor 190 is detected (S903), controller 130 changes directivity of microphone 111 (S904). Specifically, controller 130 controls digital image and audio processor 120 to output output Cch that is highly sensitive to the direction in the optical axis.

If monitor 190 is found to be closed after the open or closed state of monitor 190 is detected (S903), controller 130 does not change the directivity of microphone 111. Controller 130 provides a stereo output composed of output Lch and output Rch to digital image and audio processor 120 in the same way as when a video is normally captured.

After changing the directivity of microphone 111, controller 130 monitors an amplitude level of an audio signal from digital image and audio processor 120. Additionally, controller 130 compares the amplitude level of the audio signal with a threshold value stored in RAM 150 (S905).

The amplitude level of the audio signal is compared (S905) and, when the amplitude level exceeds the threshold value, controller 130 releases the shutter in the same way as when release button 181 is operated (S906). That is, controller 130 performs AF control and/or AE control on an image signal that is processed in digital image and audio processor 120, fixes shooting conditions, and stores the image signal captured after a predetermined time period in external storage medium 160, etc.

Here, controller 130 may display the threshold value for the amplitude level and an amplitude level of the user's voice in real-time using a level gauge on monitor 190. This allows the user to see a level above which the shutter is released.

The threshold value stored in RAM 150 can be changed on the menu screen of monitor 190. This enables setting of a suitable amplitude level according to the user.

The amplitude level of the audio signal is compared (S905) and, if the amplitude level is lower than or equal to the threshold value, controller 130 does not release the shutter.

[3. Advantageous Effects]

Digital camera 100 of the first exemplary embodiment includes the body of digital camera 100 that contains CCD image sensor 143 for capturing an object image, monitor 190 that is pivotably mounted relative to the body of digital camera 100 and displays an image signal relating to the object image captured, microphone 111, and controller 130 for changing sound pickup directivity of microphone 111 according to the orientation of monitor 190 relative to the body. Furthermore, controller 130 changes the sound pickup directivity of microphone 111 so as to increase pickup sensitivity to sound from the imaging direction when monitor 190 is directed to the imaging direction by pivoting movement.

Thus, a stereo audio signal obtained with the microphone directed to the left and right directions is generated when monitor 190 does not face forward, i.e., the imaging direction; an audio signal obtained with the microphone directed to the imaging direction is generated when monitor 190 faces forward, i.e., the imaging direction. This allows for audio recording with augmented reality when the video is recorded, and the user's voice can be picked up more clearly when a self-portrait is taken and a user activates the shutter by his/her voice.

As described above, digital camera 100 of the first exemplary embodiment changes the sound pickup directivity of microphone 111 so as to increase the pickup sensitivity to the sound from the imaging direction when monitor 190 is directed to the imaging direction by pivoting movement. However, an aspect of such directivity change is only one example of aspects of the directivity change in the present disclosure.

As another example of aspects of the directivity change in the present disclosure, the sound pickup directivity of the microphone may be changed so as to increase pickup sensitivity to sound from above when the monitor is directed upward (i.e., the display screen faces upward) by pivoting movement. In this configuration, when a user holds the digital camera at a height below head height and takes a still image, the shutter can be easily operated by voice while viewing the monitor from above with the monitor facing upward. Whether the monitor is directed upward by pivoting movement may be detected by a switch as in digital camera 100 of the first exemplary embodiment, or may be detected using a sensor, such as an angle sensor.

As still another example of aspects of the directivity change in the present disclosure, the sound pickup directivity of the microphone may be changed so as to increase pickup sensitivity to sound from below when the monitor is directed downward (i.e., the display screen faces downward) by pivoting movement. In this configuration, when the user holds the digital camera at a height above head height and takes a still image, the shutter can be easily operated by voice while viewing the monitor from below.

As described above, the aspect of the directivity change in the present disclosure only needs to change sound pickup characteristics of the microphone according to the orientation of the monitor relative to the body and, thus, the directivity may be changed when the monitor is directed to a direction other than the imaging direction.

While the sound pickup directivity of the microphone is changed so as to increase the pickup sensitivity to the sound from the same direction as that of the monitor in digital camera 100 of the first exemplary embodiment, the aspect of the directivity change in the present disclosure is not limited thereto. That is, the sound pickup directivity of the microphone can be changed so as to increase pickup sensitivity to sound from a direction different from that of the monitor. Additionally, digital camera 100 of the first exemplary embodiment further includes external storage medium 160, etc. for storing the image signal. Controller 130 stores the image signal in external storage medium 160, etc. when the amplitude level of an audio signal relating to a voice picked up by microphone 111 exceeds a predetermined value. This allows digital camera 100 to provide a voice-activated shutter function without implementing a speech recognition function imposing a significant processing load.

Additionally, digital camera 100 of the first exemplary embodiment further includes hinge shaft 191 that is mounted on the body and serves as a pivot point of monitor 190, and microphone 111 is provided in a vicinity of hinge shaft 191 on the body and on the imaging direction side relative to hinge shaft 191. Thus, monitor 190 serves as a sound reflector when monitor 190 is open and the pickup sensitivity to the user's voice can be increased.

Other Exemplary Embodiments

The present disclosure is not limited to the first exemplary embodiment, and various exemplary embodiments are contemplated. Other exemplary embodiments of the present disclosure are enumerated below.

In the first exemplary embodiment, the body of digital camera 100 includes microphone L 112 and microphone R 113 and is configured to obtain the output of virtual microphone 111C from the outputs of microphone L 112 and microphone R 113. However, microphone 111 only needs to be configured to change the sound pickup directivity, so that microphone 111 may be configured with a single microphone or three or more microphones.

In the first exemplary embodiment, output Lch, output Rch, and output Cch are made using the directivity synthesis shown in FIGS. 6A through 6F. However, the directivity synthesis may be configured in different ways other than as depicted in FIGS. 6A through 6F.

The technique of the present disclosure, which allows an imaging apparatus to be activated by a voice, is applicable to digital cameras, movie cameras, mobile phones, and the like.

What is claimed is:

1. An imaging apparatus comprising:
    a body that contains an imaging unit for capturing an object image,
    a monitor that is pivotably mounted relative to the body and displays an image signal relating to the object image captured by the imaging unit,
    a microphone body including a plurality of microphone units provided on the body, and
    a control unit that changes sound pickup directivity of the microphone body by using an output of an audio signal from each of the plurality of microphone units, according to an orientation of the monitor relative to the body.

2. The imaging apparatus according to claim 1, wherein the control unit changes the sound pickup directivity of the microphone so as to increase pickup sensitivity to sound from an imaging direction of the imaging unit when the monitor is directed to the imaging direction by pivoting movement.

3. The imaging apparatus according to claim 1, further comprising a memory for storing the image signal, wherein the control unit stores the image signal in the memory when an amplitude level of an audio signal relating to a voice picked up by the microphone exceeds a predetermined value.

4. The imaging apparatus according to claim 1, further comprising a pivot shaft that is mounted on the body and serves as a pivot point of the monitor, wherein the microphone is provided in a vicinity of the pivot shaft on the body and on an imaging direction side relative to the pivot shaft.

5. The imaging apparatus according to claim 1, wherein the at least one microphone includes a right microphone and a left microphone positioned in a spaced apart relationship with respect to each other on a same surface of the body.

* * * * *